UNITED STATES PATENT OFFICE.

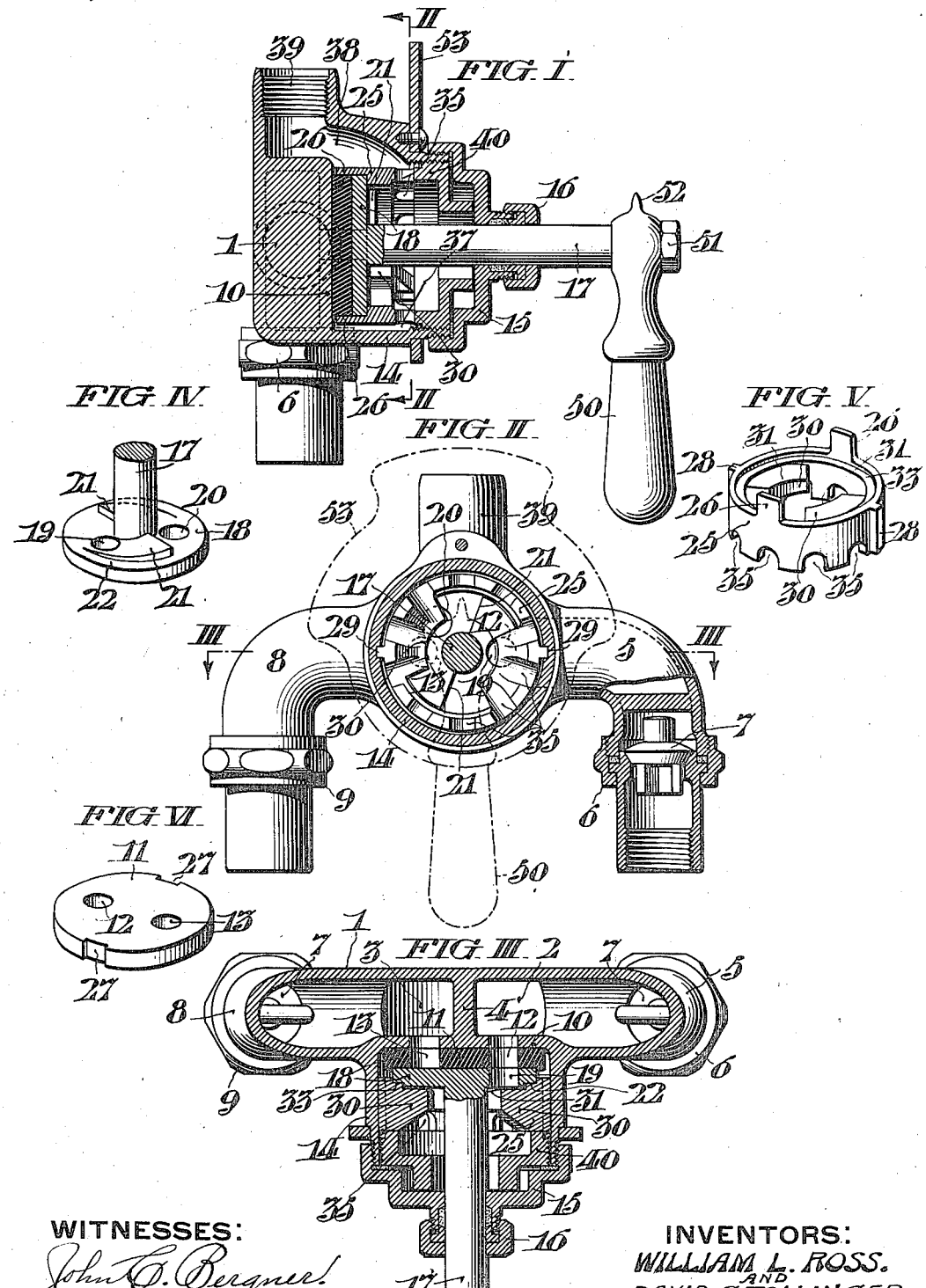

WILLIAM L. ROSS AND DAVID C. TOLLINGER, OF PHILADELPHIA, PENNSYLVANIA; GERTRUDE L. TOLLINGER, ADMINISTRATRIX OF SAID DAVID C. TOLLINGER, DECEASED.

MIXING-FAUCET.

949,044.    Specification of Letters Patent.    Patented Feb. 15, 1910.

Application filed July 30, 1908. Serial No. 446,036.

*To all whom it may concern:*

Be it known that we, WILLIAM L. ROSS and DAVID C. TOLLINGER, of Philadelphia, in the county of Philadelphia and State of Pennsylvania, have invented certain new and useful Improvements in Mixing-Faucets, whereof the following is a specification, reference being had to the accompanying drawings.

Our invention relates to mixing faucets by which two liquids may be simultaneously discharged through a common aperture in any desired proportions, or either one discharged alone, or both shut off.

It concerns more particularly certain improvements in mixing faucets of the type for which we have already secured United States Letters Patent No. 736,023, dated August 11th, 1903, and No. 796,252, dated August 1st, 1905, having particular relation to an improved construction of the mixing chamber; the use of a special distributing collar; the alinement of the feed and discharge pipes; the more perfect control and regulation of the mixing valve; and the means employed for closing the valve chamber.

We have illustrated our invention and will describe it as especially designed for regulating the admission of hot and cold water in any desired proportions to a bath or shower.

In the accompanying drawings, Figure I, is an axial section of a mixing faucet embodying our invention. Fig. II, is a cross section taken along the line II, II, of Fig. I. Fig. III, is an axial section taken along the lines III, III, of Fig. II. Fig. IV, V and VI, are detailed perspective views respectively of the valve, mixing collar and the facing disk, the mixing collar of Fig. V being shown in an inverted position.

In said figures 1, is the base of the faucet, containing two fluid chambers 2, 3, separated from each other by a central partition 4. The chamber 2, communicates by the elbow 5, with one of the supply pipes, for example the hot water supply, a coupling 6, being interposed, which is provided with a check valve 7, by which reflex flow due to overpressure in the other pipe, is prevented. The chamber 3, similarly communicates by the elbow 8, with the other feed pipe, (say cold water), with the similar interposition of a coupling 9, also provided with a check valve 7.

Above the base of the faucet is formed the valve seat 10, the upper surface of which is provided with a facing disk 11, of suitable resilient material. Piercing the valve seat and its facing disk is a circular aperture 12, communicating with the hot water chamber, and a circular aperture 13, communicating with the cold water chamber, the two apertures being diametrically opposite with relation to the axial line of the valve. Upon the valve side of the faucet base is formed integrally the extended collar 14, which forms the valve casing. This casing is closed by an internally threaded top 15, screwed upon the externally threaded outer edge of the casing, and provided centrally with a stuffing box 16, for the reception of the valve stem 17, which carries the valve disk, 18. This valve disk is replaceable and rests closely upon the facing disk 11, of the valve seat. It is pierced by two circular apertures 19, and 20, placed as shown in Figs. II, and IV, from which it will be observed that when one of them is in full registry with its corresponding aperture in the valve seat, the periphery of the other is approaching its corresponding aperture in the valve seat, so that in proportion as rotation of the valve tends to close the hot water aperture 12, will the cold water aperture 13, be opened, and vice versa.

Upon the upper surface of the rotary valve disk are two shallow cam inclines 21, 21, formed on opposite sides of the axis of the valve. These cam inclines however do not reach to the edge of the valve disk, leaving around said edge an annular bearing surface 22. Within the valve casing rests a mixing collar 25, forming a separate and replaceable piece, and best shown in the perspective view of Fig. V. This mixing collar is provided upon its lower edge with two downwardly projecting lugs 26, 26, which project below the lower surface of the valve disk, and enter peripheral notches 27, 27, of the resilient facing of the valve seat, whereby the facing is maintained with its openings in exact registry with those of the valve seat by reason of the fact that the mixing collar is provided with opposing keys 28, 28, entering key ways 29, 29, formed in the inner wall of the valve casing. The mixing collar is further provided with projections 30, 30, having formed on their lower edge cam inclines 31, 31, corresponding to and coöperating with the cam-inclines 21, 21, upon the upper surface of the valve disk. The lower edge of the mixing collar has a seat 33, formed just below the cam-inclines, and forming a bearing surface which bears against the corresponding bearing surface 22, on the upper surface of the valve disk. The upper edge of the mixing collar is provided with a number of semi-circular notches 35, extending through it on all sides, so that the liquid which enters the mixing collar through the valve is discharged in all directions through these notches into the annular chamber 37, formed by the space between the outer edge of the mixing collar and the inner edge of the valve casing. This space communicates with an exit way 38, forming part of the valve casing, passing downwardly to a discharge orifice 39, situated in the base within the same plane as the two feed pipes. The mixing collar when seated within the valve casing, is driven into place by the annular cap 40, the periphery of which is threaded to engage an internal thread upon the inner edge of the valve casing. As this cap is screwed into place the mixing collar is driven down so that its lugs 26, properly engage the resilient facing of the valve seat, and at the same time its bearing surface 33, pressing against the corresponding bearing surface 22, of the valve disk forces the disk against the facing with whatever pressure may be desired to maintain the requisite tightness of the valve. The pressure thus exerted, it will be observed, is quite independent of any additional pressure exerted upon the disk by virtue of the engagement of the cam inclines of the disk with the corresponding cam inclines of the mixing collar which occurs upon rotation of the valve and which tends to drive the valve disk even more heavily against its seat. The annular cap 40, does not however close the valve chamber by reason of the fact that its central aperture is much larger than that of the valve stem, the closure of the chamber being effected by the top 15. It will, therefore, be seen that in assembling the valve members, the pressure with which the valve disk is initially set to rotate upon its seat is quite independent of the closure of the valve chamber, as is likewise any subsequent adjustment of its pressure.

In operation the hot and cold water pass through the apertures 12, and 13, of the valve seat as permitted by the registration therewith of the openings in the valve disk, and in such proportions enter the valve chamber within the mixing collar by which they are mixed and distributed radially through the notches 35, in all directions, with the result that as two fluids pass around the annular chamber to the exit way 38, they become more thoroughly mixed than in the mixing faucets previously patented to us, in which the mixing collar is absent, and which are referred to at the beginning of this specification. For the purpose of regulating the proportion in which the two liquids are admitted, the valve is rotated and during this rotation is pressed against its seat only by pressure exerted by the mixing collar, which is in turn dependent upon the screw cap 40; but as the valve seat further rotates to close both apertures, the cam inclines upon the upper surface of the valve seat coöperate with those upon the mixing collar, exerting further pressure to seat the valve against the facing disk, so that when the position of complete closure is reached the sealing of the valve is very tight.

Upon the protruding end of the valve stem is a polygonal extremity carrying the handle 50, held in place by the nut 51. This handle may conveniently be provided with an index point 52, while surrounding the valve casing is an annular plate 53, upon which suitable words or letters may be cast to indicate the varying functions of the valve, according to position, as read by the relation of the finger to these words or letters. Since these words or letters are ordinarily cast in advance upon the plate and since their proper position would ordinarily depend upon which of the feed pipes is connected to hot water and which to cold water, it becomes important at times to provide for the reversal of this arrangement without either an inversion of the faucet or of the position of the feed pipes, and it will be observed that the position of the respective apertures in the valve disk according to our invention is such that a precise inversion of the operation of the valve can be secured by a semi-rotation of the valve so that by this half rotation with a corresponding inversion of the position of the handle, the reading of the finger of the handle against the plate will be correct notwithstanding that the position of the feed pipes has been reversed.

By arranging the feed pipes and the exit pipe all in the plane of the faucet base, the faucet and its connections fit conveniently against a wall. The fact that the base with its two feeds and the valve casing and its exit orifice are all formed integrally prevents any disturbance of the adjustment of the valve parts or any leakage due to forcing or straining of the pipes when putting them in place.

It will be noticed that the parts of our faucet which are subject to wear are the facing disk for the seat, the valve disk with its stem, the mixing collar and the stuffing box. All of these are independent and readily replaceable parts.

Having thus described our invention, we claim:

1. In a mixing faucet, a valve casing containing a valve seat and a rotary disk mixing valve; a screw top closing the valve casing; and means, independent of the means for closing the valve casing, for adjusting the pressure of the mixing valve upon its seat.

2. In a mixing faucet, the combination of the complete valve casing containing within itself as separate and replaceable parts, a rotary disk valve, a facing disk for the valve seat, and a collar by the adjustment of which on the side of the valve opposite the seat, the valve is pressed against its seat.

3. In a mixing faucet, the combination of the valve casing containing a facing disk, a rotary disk valve, and a collar, the latter being keyed within the casing and provided with one or more lugs engaging the facing disk and holding it from rotation.

4. In a mixing faucet, the combination of the valve casing containing a valve seat, a rotary disk valve, and a mixing collar provided with numerous apertures of a size to leave an annular space surrounding it between its outer periphery and the inside of the valve casing.

5. In a mixing faucet, a rotary disk valve with two apertures, and two cam inclines in alternation around the valve stem, a plane bearing surface near the periphery of the valve, and a collar bearing upon said valve with a plane bearing surface in opposition to the similar surface of the valve, and cam inclines upon said collar, which in the position of closure of the valve are in coöperation with its cam inclines.

In testimony whereof, I have hereunto signed my name, at Philadelphia, Pennsylvania, this 24th day of July 1908.

WILLIAM L. ROSS.

Witnesses:
 JAMES H. BELL,
 E. L. FULLERTON.

In testimony whereof, I have hereunto signed my name, at Stewartstown, York co. Pa. this 27th day of July 1908.

DAVID C. TOLLINGER.

Witnesses:
 W. R. S. ANSTINE,
 SAMUEL T. ESMAY.